United States Patent
Takeshita et al.

(10) Patent No.: US 12,555,971 B2
(45) Date of Patent: Feb. 17, 2026

(54) LIGHT AMPLIFICATION DEVICE, LIGHT TRANSMISSION SYSTEM, AND LIGHT AMPLIFICATION METHOD

(71) Applicant: NEC Corporation, Tokyo (JP)

(72) Inventors: Hitoshi Takeshita, Tokyo (JP); Keiichi Matsumoto, Tokyo (JP); Hidemi Noguchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 934 days.

(21) Appl. No.: 17/765,505

(22) PCT Filed: Oct. 7, 2019

(86) PCT No.: PCT/JP2019/039419
§ 371 (c)(1),
(2) Date: Mar. 31, 2022

(87) PCT Pub. No.: WO2021/070211
PCT Pub. Date: Apr. 15, 2021

(65) Prior Publication Data
US 2022/0385026 A1    Dec. 1, 2022

(51) Int. Cl.
*H01S 3/00* (2006.01)
*H01S 3/067* (2006.01)
(Continued)

(52) U.S. Cl.
CPC ........ *H01S 3/1003* (2013.01); *H01S 3/06737* (2013.01); *H01S 3/1301* (2013.01); *H04B 10/25* (2013.01)

(58) Field of Classification Search
CPC .. H01S 3/1003; H01S 3/06737; H01S 3/1301; H04B 10/25
See application file for complete search history.

(56) References Cited

U.S. PATENT DOCUMENTS 8,355,605 B1   1/2013   Wach
2013/0301998 A1  11/2013  Hayashi
(Continued)

FOREIGN PATENT DOCUMENTS

JP    2011-512653 A    4/2011
JP    2012-222613 A    11/2012
(Continued)

OTHER PUBLICATIONS

JP Office Communication for JP Application No. 2023-125201, mailed on Jul. 16, 2024 with English Translation.
(Continued)

*Primary Examiner* — Mark Hellner
(74) *Attorney, Agent, or Firm* — Sughrue Mion, PLLC

(57) ABSTRACT

Light amplification devices using coupled multi-core optical fibers have a figure of merit that temporally varies, which makes it difficult to perform performance evaluation and to build a light transmission system using the same. Accordingly, a light amplification device of the present invention comprises: a band control means that controls the wavelength band of a light carrier to generate a band control light; and a band control light amplification means that has a plurality of light amplification media through which the band control light propagates, wherein the band control light amplification means amplifies the band control light in a coupled state in which the light propagating through the plurality of light amplification media induces a crosstalk and wherein the band control means controls the wavelength band such that the band control light having propagated through the plurality of light amplification media has a reduced coherence.

20 Claims, 9 Drawing Sheets

(51) Int. Cl.
H01S 3/10 (2006.01)
H01S 3/13 (2006.01)
H04B 10/25 (2013.01)

(56) References Cited

U.S. PATENT DOCUMENTS

| | | | |
|---|---|---|---|
| 2015/0078744 A1 | 3/2015 | Ito et al. | |
| 2017/0222716 A1* | 8/2017 | Nakashima | H04B 10/25 |
| 2018/0069625 A1* | 3/2018 | Arikawa | H04B 10/077 |
| 2020/0389248 A1* | 12/2020 | Goto | H04J 14/0305 |
| 2021/0057871 A1 | 2/2021 | Matsumoto et al. | |
| 2021/0359485 A1* | 11/2021 | Nakamura | H01S 3/06754 |

FOREIGN PATENT DOCUMENTS

| | | | | |
|---|---|---|---|---|
| JP | 2016042164 A | * | 3/2016 | ......... H01S 3/06754 |
| JP | 2017-021070 A | | 1/2017 | |
| JP | 2017022638 A | * | 1/2017 | ........... H04B 10/077 |
| JP | 6372598 B2 | | 8/2018 | |
| JP | 2019-075450 A | | 5/2019 | |
| WO | 2018/047867 A1 | | 3/2018 | |
| WO | 2018/135621 A1 | | 7/2018 | |
| WO | 2018/198326 A1 | | 11/2018 | |
| WO | 2019/187051 A1 | | 10/2019 | |

OTHER PUBLICATIONS

Office Action for EP Application No. 19948774.5, mailed on Sep. 26, 2022 with English Translation.
Saridis, George M et al: "Survey and Evaluation of Space Division Multiplexing:From Technologies to Optical Networks", IEEE Communications Surveys & Tutorials, vol. 17, Issue: 4, Fourthquarter 2015, pp. 2136-2156, Aug. 20, 2015.
International Search Report for PCT Application No. PCT/JP2019/039419, mailed on Dec. 10, 2019.
Rademacher, Georg et al., "Impact of Modulation Format on Dynamic Channel Crosstalk Behavior in Multi-Core Fibers", 2019 Optical Fiber Communications Conference and Exhibition (OFC), 2019, 03, pp. 1-3.
Wada, Masaki et al., "Cladding Pumped Randomly Coupled 12-Core Erbium-Doped Fiber Amplifier With Low Mode-Dependent Gain", Journal of Lightwave Technology, 2018, vol. 36, No. 5, pp. 1220 to 1225.
JP Office Action for JP Application No. 2024-132781, mailed on Aug. 5, 2025 with English Translation.

* cited by examiner

Fig. 9

|  | MULTIPLEXING SCHEME 1 | MULTIPLEXING SCHEME 2 |
|---|---|---|
| NUMBER OF USED CORES | N | 1/2 × N |
| TRANSMISSION SPEED | B | 2 × B |
| TRANSMISSION CAPACITY | N × B | N × B |

LIGHT AMPLIFICATION DEVICE, LIGHT TRANSMISSION SYSTEM, AND LIGHT AMPLIFICATION METHOD

CROSS-REFERENCE TO RELATED APPLICATIONS

This application is a National Stage Entry of PCT/JP2019/039419 filed on Oct. 7, 2019, the contents of all of which are incorporated herein by reference, in their entirety.

TECHNICAL FIELD

The present invention relates to a light amplification device, a light transmission system, and a light amplification method, and in particular, relates to a light amplification device, a light transmission system, and a light amplification method, which use a multi-core optical fiber.

BACKGROUND ART

Due to rapid expansion and the like of mobile traffic and video services, there is a need to expand communication capacity in a core network. This demand for capacity expansion tends to continue in future. Expansion of communication capacity has been achieved by using a time-multiplex technique and a wavelength-multiplex technique. These time-multiplex and wavelength-multiplex techniques have been applied to an optical communication system using a single-core optical fiber.

When a single-core optical fiber is used, there is a limit to the number of multiplexes of optical signals that can be transmitted through a single core, i.e., a single optical fiber core, and the limit has been reached in recent years. The limit of the number of multiplexes is determined by a wavelength bandwidth that is available in optical fiber communication and input-light intensity tolerance of the single-core optical fiber.

In such a situation, a spatial multiplex technique, which is a multiplex technique of different dimension from a conventional multiplex technique, is developed in order to further expand the communication capacity. In the spatial multiplex technique, there are a multi-core technique that increases the number of cores per optical fiber, and a multi-mode technique that increases the number of propagation modes. Both the number of cores and the number of modes that are used in conventional optical fiber communication are one. Therefore, it is possible to rapidly expand the communication capacity by increasing the number of cores and the number of modes.

However, when the number of cores and the number of modes of an optical fiber are increased, it is not possible to use an optical transmitter/receiver and an optical amplifier that are currently in wide use as they are. This is because the optical transmitter/receiver and the optical amplifier currently in use are developed for a single-core optical fiber and are not compatible with a multi-core optical fiber and a multi-mode optical fiber. Therefore, a technique that achieves an optical transmitter/receiver and an optical amplifier that are suitable for a multi-core optical fiber and a multi-mode optical fiber has been proposed.

There are two types of multi-core optical fibers, which are a coupled multi-core optical fiber and an uncoupled multi-core optical fiber. The uncoupled multi-core optical fiber has an advantage that an effect of crosstalk between cores is negligible because a distance (pitch) between the cores is large. However, the uncoupled multi-core optical fiber has a disadvantage that the number of cores is difficult to be increased because the cores cannot be arranged densely. Meanwhile, a distance (pitch) between cores of the coupled multi-core optical fiber is small, contrary to that of the uncoupled multi-core optical fiber (e.g., see PTL 1). Therefore, although the coupled multi-core optical fiber has a disadvantage that an effect of crosstalk between the cores becomes large, there is an advantage that the number of cores can be easily increased because the cores can be densely arranged. Further, the coupled multi-core optical fiber has a superior optical transmission characteristic that a transmission distance of an optical signal can be increased because an influence of a non-linear optical effect is smaller than that of the uncoupled multi-core optical fiber. This characteristic is a great advantage in constructing a long-distance light transmission system.

As a light amplification method suitable for a multi-core optical fiber, there are two methods, which are a core pumping method and a cladding pumping method. In the core pumping method, intensity of an optical signal to be optically transmitted through each core is separately amplified by using a separate pumping light source for each core. In the cladding pumping method, intensity of an optical signal to be optically transmitted through each core is collectively amplified by using a common pumping light source (e.g., see PTL 2). The cladding pumping method can be used in case of using either one of the uncoupled multi-core optical fiber and the coupled multi-core optical fiber.

In order to efficiently amplify light intensity of an optical signal to be transmitted through a multi-core optical fiber, it is desirable to use the cladding pumping method in which intensity of an optical signal to be optically transmitted through each core is collectively amplified by using a common pumping light source. Further, in the cladding pumping method, a configuration of a conventional optical amplifier based on a single-core pumping method can be used, in principle, as it is as a configuration of an optical amplifier, based on the cladding pumping method.

CITATION LIST

Patent Literature

[PTL 1] Japanese Patent No. 6372598
[PTL 2] Japanese Unexamined Patent Application Publication No. 2017-21070

SUMMARY OF INVENTION

Technical Problem

In the above-described coupled multi-core optical fiber, since the distance between cores (core spacing) is small, crosstalk occurs, in which a part of an optical signal leaking from each core is coupled with an optical signal passing through another core. An amount of the crosstalking optical signals is highly dependent on an effective refractive index difference between the cores. An effective refractive index difference between the cores is affected by parameters such as bending and temperature of the coupled multi-core optical fiber, and these parameters depend on an installation environment of the coupled multi-core optical fiber. Further, since these parameters may vary complicatedly over time, it is very difficult to predict a change in these parameters. Therefore, it is also very difficult to predict time variation of the crosstalk between the cores of the coupled multi-core optical fiber, which depends on the parameters such as bending and temperature of the optical fiber. When the crosstalk is not negligible, light intensity of an optical signal passing through each core of the coupled multi-core optical fiber fluctuates over time.

When such a coupled multi-core optical fiber is applied to an optical amplifier based on the cladding pumping method, a light amplification process changes over time. Therefore, performance indices of the optical amplifier, such as a degree of light amplification and a noise figure, change over time, and the change is difficult to predict. This is a major problem in performance evaluation of the optical amplifier itself and in operation of a light transmission system and the like using the optical amplifier. This is because indices of performance of an optical amplifier currently in use, such as a degree of light amplification and a noise figure, are assumed to be constant over time and are not assumed to vary over time.

Since the optical amplifier amplifies both an optical signal component and an inter-core crosstalk component in a similar way, an effect of the crosstalk between the cores is also amplified. Therefore, when a degree of light amplification and a noise figure change over time and are difficult to predict, an optical level and an optical S/N ratio of the light transmission system and the like are very complex to design. In particular, when there are few margins in the design of the optical level and the optical S/N ratio, as in a long-distance light transmission system, design and operation of the light transmission system become substantially impossible.

Thus, a light amplification device using the coupled multi-core optical fiber has a problem that, since a performance index of the light amplification device changes over time, it is difficult to perform performance evaluation and to construct a light transmission system using the coupled multi-core optical fiber.

An object of the present invention is to provide a light amplification device, a light transmission system, and a light amplification method that solve the above-described problem.

Solution to Problem

A light amplification device according to the present invention includes: a band control means for controlling a wavelength band of an optical carrier wave and thereby generating band control light; and a band control light amplification means including a plurality of light amplification media through which the band control light propagates. The band control light amplification means amplifies the band control light in a coupled state in which propagation light propagating through the plurality of light amplification media induces a crosstalk, and the band control means controls the wavelength band in such a way that coherence of the band control light that has propagated through the plurality of light amplification media is reduced.

A light transmission system according to the present invention includes: a light amplification means for controlling a wavelength band of an optical carrier wave and thereby generating band control light and amplifying band control light; a light detection means for detecting intensity of the band control light being amplified by the light amplification means, and generating light intensity information; and a control means for controlling the light amplification means in such a way as to adjust the wavelength band, based on the light intensity information.

A light amplification method according to the present invention includes: controlling a wavelength band of an optical carrier wave and thereby generating band control light; introducing the band control light into a plurality of light amplification media, amplifying the band control light in a coupled state in which propagation light propagating through the plurality of light amplification media induces a crosstalk; and controlling the wavelength band in such a way that coherence of the band control light that has propagated through the plurality of light amplification media is reduced.

Advantageous Effects of Invention

According to the light amplification device, the light transmission system, and the light amplification method according to the present invention, performance evaluation of a light amplification device using a coupled multi-core optical fiber and construction of a light transmission system using a coupled multi-core optical fiber are enabled.

BRIEF DESCRIPTION OF DRAWINGS

FIG. 9 is a diagram for explaining a multiplexing scheme in the light transmission system according to the fourth example embodiment of the present invention.

DETAILED DESCRIPTION

In the following, example embodiments of the present invention will be described with reference to the drawings.

First Example Embodiment

Figure 1:
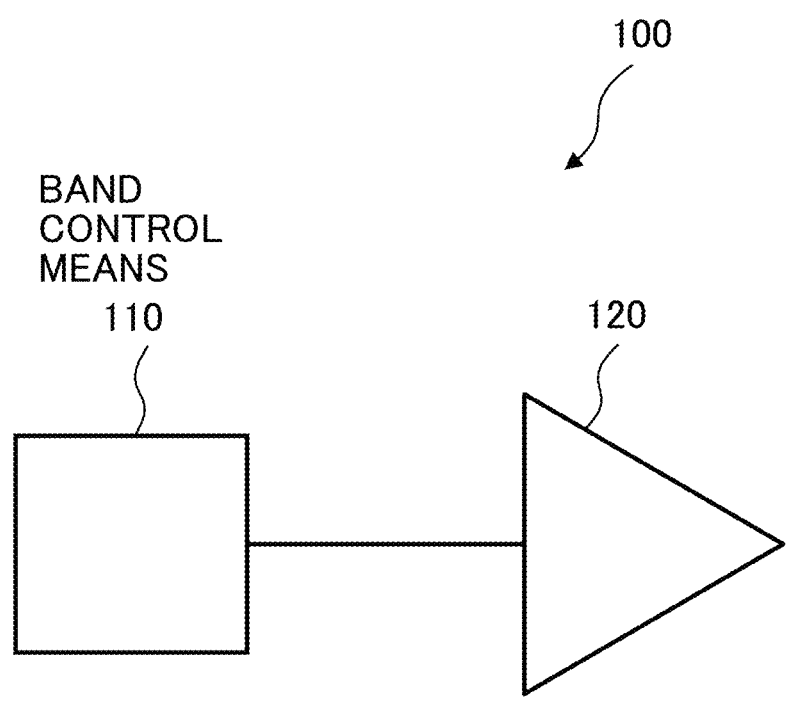
FIG. 1 is a block diagram illustrating a configuration of a light amplification device according to a first example embodiment of the present invention.

FIG. 1 is a block diagram illustrating a configuration of a light amplification device 100 according to a first example embodiment of the present invention. The light amplification device 100 includes a band control means 110 and a band control light amplification means 120.

The band control means 110 controls a wavelength band of an optical carrier wave and thereby generates a band control light. The band control light amplification means 120 includes a plurality of light amplification media through which the band control light propagates. Herein, the band control light amplification means 120 amplifies the band control light in a coupled state in which propagation light propagating through the plurality of light amplification media induces a crosstalk. Further, the band control means 110 controls the wavelength band in such a way that coherence of the band control light that has propagated through the plurality of light amplification media is reduced.

Thus, in the light amplification device 100 according to the present example embodiment, the band control light amplification means 120 is configured to amplify the band control light in the coupled state in which the propagation light induces a crosstalk. Specifically, the band control light amplification means 120 may include a coupled multi-core optical fiber having a plurality of cores arranged in close proximity, and the coupled multi-core optical fiber may be configured to include a light amplification medium in at least a part of each of the plurality of cores.

Herein, while interference between optical signals (propagation lights) may occur due to the crosstalk, in the light amplification device 100 according to the present example embodiment, the band control means 110 is configured to control the wavelength band in such a way that the coherence of the band control light that has propagated through the plurality of light amplification media is reduced. Therefore, even when the crosstalk occurs between the optical signals passing through different cores of the coupled multi-core optical fiber, interference of the optical signals does not occur. Thus, it is possible to suppress time fluctuation of intensity of the optical signal being output from each core of the coupled multi-core optical fiber. Consequently, according to the light amplification device 100 according to the present example embodiment, performance evaluation of a light amplification device using a coupled multi-core optical fiber and construction of a light transmission system using a coupled multi-core optical fiber are enabled.

The interference between the optical signals is greatest for optical signals of a single wavelength, and becomes smaller as wavelength components, i.e., the wavelength band, increases. A reason for this is that the larger the wavelength band is, i.e., the more various wavelength components are mixed, the harder it is to satisfy a phase condition for interfering between the wavelength components. This condition is determined by a coherence length Lc. When a center wavelength of an optical signal is λ and a wavelength band is Δλ, the coherence length Lc is expressed as Equation (1) in the following.

$$L_c = \frac{\lambda^2}{\Delta\lambda} \quad (1)$$

When a length L of the coupled multi-core optical fiber is sufficiently longer than the coherence length Lc determined by Equation (1), no interference occurs between the optical signals passing through different cores. Therefore, the band control means 110 can be configured to control the wavelength band in such a way that the coherence length of the band control light becomes shorter than the length of the coupled multi-core optical fiber.

Figure 2:
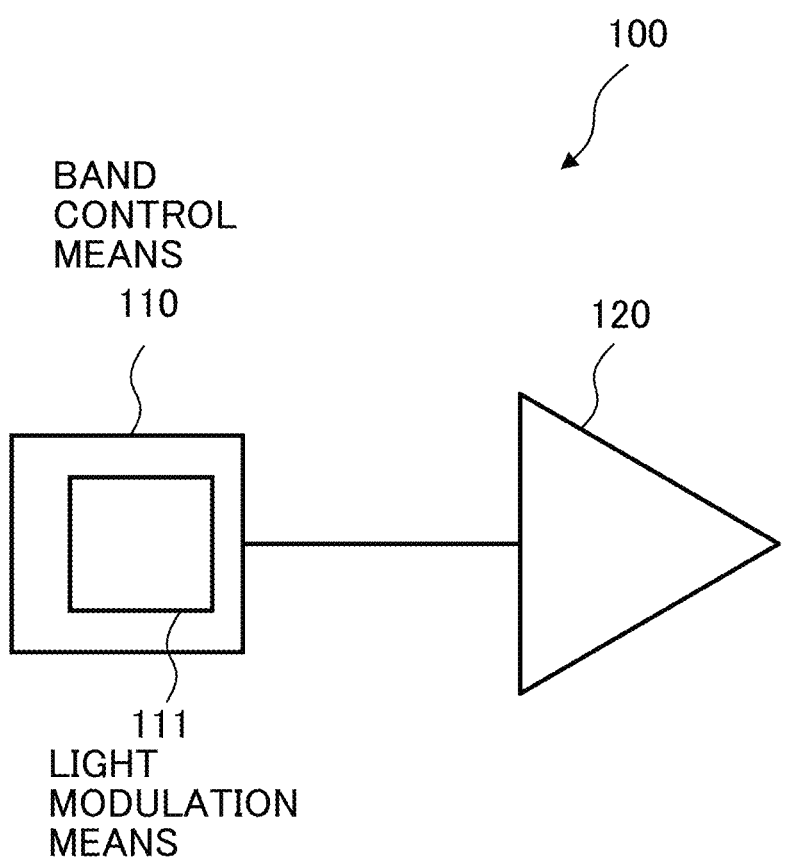
FIG. 2 is a block diagram illustrating another configuration of the light amplification device according to the first example embodiment of the present invention.

Note that, when the coupled multi-core optical fiber length L is constant, the larger the wavelength band Δλ is, i.e., as the wavelength components increase, the interference between the optical signals passing through different cores is suppressed. Herein, it is possible to expand the wavelength band Δλ by modulating the optical carrier wave. Therefore, as illustrated in FIG. 2, the band control means 110 may also be configured to include a light modulation means 111 for modulating the optical carrier wave. In this case, the light modulation means may modulate the optical carrier wave at a period shorter than a coherence time determined by the coherence length. Specifically, the light modulation means can be configured to modulate the optical carrier wave with a frequency higher than an inverse number of a time required for the band control light to propagate through the coupled multi-core optical fiber. By employing such a configuration, it is possible to suppress the interference between the optical signals passing through different cores.

Next, a light amplification method according to the present example embodiment will be described.

In the light amplification method according to the present example embodiment, first, a wavelength band of an optical carrier wave is controlled, band control light is generated, and the band control light is introduced into a plurality of light amplification media. After that, the band control light is amplified in a coupled state in which propagation light propagating through the plurality of light amplification media induces a crosstalk. Further, the wavelength band is controlled in such a way that coherence of the band control light that has propagated through the plurality of light amplification media is reduced.

The introducing the above-described band control light into the plurality of light amplification media can be configured to include introducing the band control light into a coupled multi-core optical fiber. Herein, the coupled multi-core optical fiber has a plurality of cores arranged in close proximity, and includes a light amplification medium in at least a part of each of the plurality of cores.

Further, in the light amplification method according to the present example embodiment, the controlling the wavelength band can be controlling the wavelength band in such a way that a coherence length of the band control light becomes shorter than a length of the coupled multi-core optical fiber.

Further, in the light amplification method according to the present example embodiment, the controlling the wavelength band may be modulating the optical carrier wave. In this case, the modulating the optical carrier wave can be modulating the optical carrier wave with a frequency higher than an inverse number of a time required for the band control light to propagate through the coupled multi-core optical fiber.

As described above, according to the light amplification device 100 and the light amplification method according to the present example embodiment, performance evaluation of a light amplification device using a coupled multi-core optical fiber and construction of a light transmission system using a coupled multi-core optical fiber are enabled.

Second Example Embodiment

Figure 3:
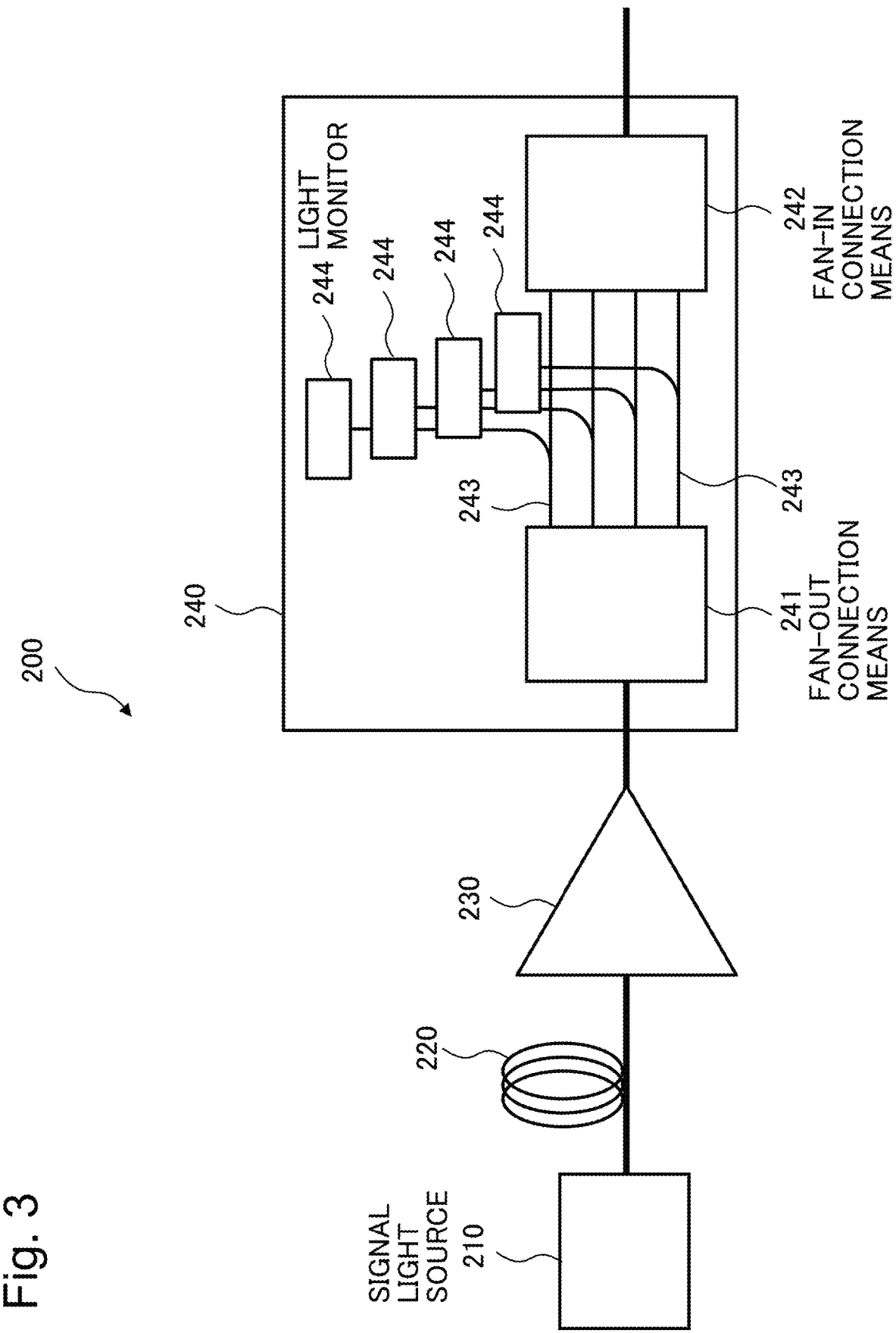
FIG. 3 is a block diagram illustrating a configuration of a light amplification device according to a second example embodiment of the present invention.

Next, a second example embodiment of the present invention will be described. A configuration of a light amplification device 200 according to the present example embodiment is illustrated in FIG. 3.

The light amplification device 200 includes a signal light source 210, a coupled multi-core optical fiber 220, a coupled multi-core fiber optical amplifier 230, and a light detection unit (light detection means) 240.

The signal light source 210 includes a band control means for controlling a wavelength band of an optical carrier wave and thereby generating band control light.

The coupled multi-core optical fiber 220 and the coupled multi-core fiber optical amplifier 230 include a coupled multi-core optical fiber in which a plurality of cores are arranged in close proximity. Herein, distances between cores of the coupled multi-core optical fiber 220 and the coupled multi-core fiber optical amplifier 230 can both be, for example, 25 micrometers (μm) or less. Note that, the coupled multi-core optical fiber 220 and the coupled multi-core fiber optical amplifier 230 constitute a band control light amplification means.

The coupled multi-core fiber optical amplifier 230 includes a plurality of light amplification media through which the band control light propagates, and amplifies the band control light in a coupled state in which propagation light propagating through the plurality of light amplification media induces a crosstalk. The coupled multi-core fiber optical amplifier 230 typically includes a core as a light amplification medium doped with an erbium ion, which is a rare-earth ion, and has a double cladding structure. In the coupled multi-core fiber optical amplifier 230 with such a configuration, a cladding pumping method can be used as a light amplification method.

The light detection unit (light detection means) 240 detects intensity of the band control light that has propagated through at least one of the plurality of cores of the coupled multi-core fiber optical amplifier 230, and thereby generates light intensity information. Herein, the light detection unit 240 includes a fan-out connection means 241 and a fan-in connection means 242 for connecting each core of the multi-core fiber and a single-mode fiber 243, and a light monitor 244. In FIG. 3, a configuration in which the coupled multi-core fiber optical amplifier 230 includes four cores, the fan-out connection means 241 connects to four single-mode fibers 243, and four light monitors 244 each monitors intensity of the band control light that has propagated through each core is illustrated as an example.

The band control means included in the signal light source 210 controls the wavelength band in such a way that coherence of the band control light that has propagated through the plurality of light amplification media (cores) of the coupled multi-core fiber optical amplifier 230 is reduced, based on the light intensity information generated by the light detection unit 240.

Specifically, for example, the light detection unit 240 determines whether an intensity fluctuation value of output light from each core of the coupled multi-core fiber optical amplifier 230 exceeds a predetermined constant value. Further, when the intensity fluctuation value of the output light exceeds the predetermined constant value, the light detection unit 240 generates light intensity information indicating that fact. In this case, the band control means included in the signal light source 210 adjusts a wavelength band of an optical carrier wave to be input to each core in such a way that the intensity fluctuation value of the output light from each core falls within a predetermined range.

By employing such a configuration, it is possible to suppress time fluctuation of intensity of the optical signal being output from each core of the coupled multi-core optical fiber. Consequently, according to the light amplification device 200 according to the present example embodiment, performance evaluation of a light amplification device using a coupled multi-core optical fiber and construction of a light transmission system using a coupled multi-core optical fiber are enabled.

Figure 4:
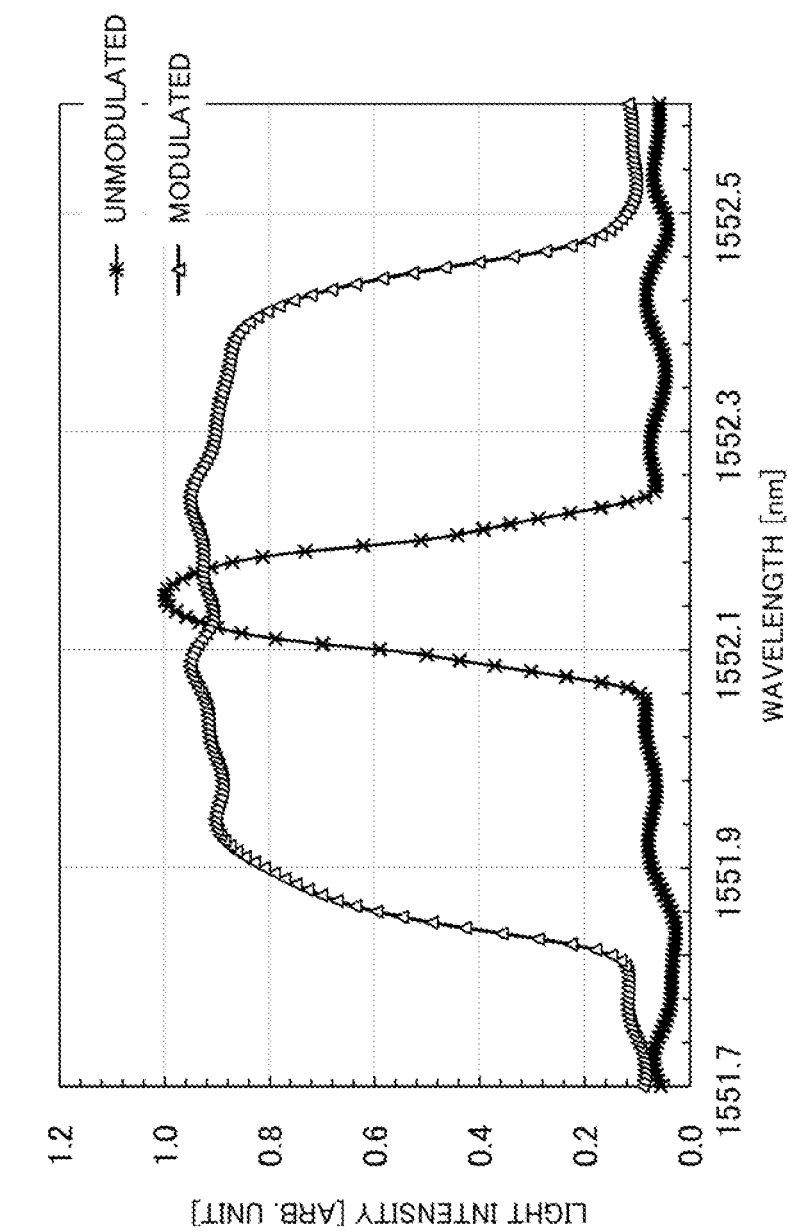
FIG. 4 is a diagram illustrating an example of a spectrum of output light of a signal light source included in the light amplification device according to the second example embodiment of the present invention.
Figure 5:
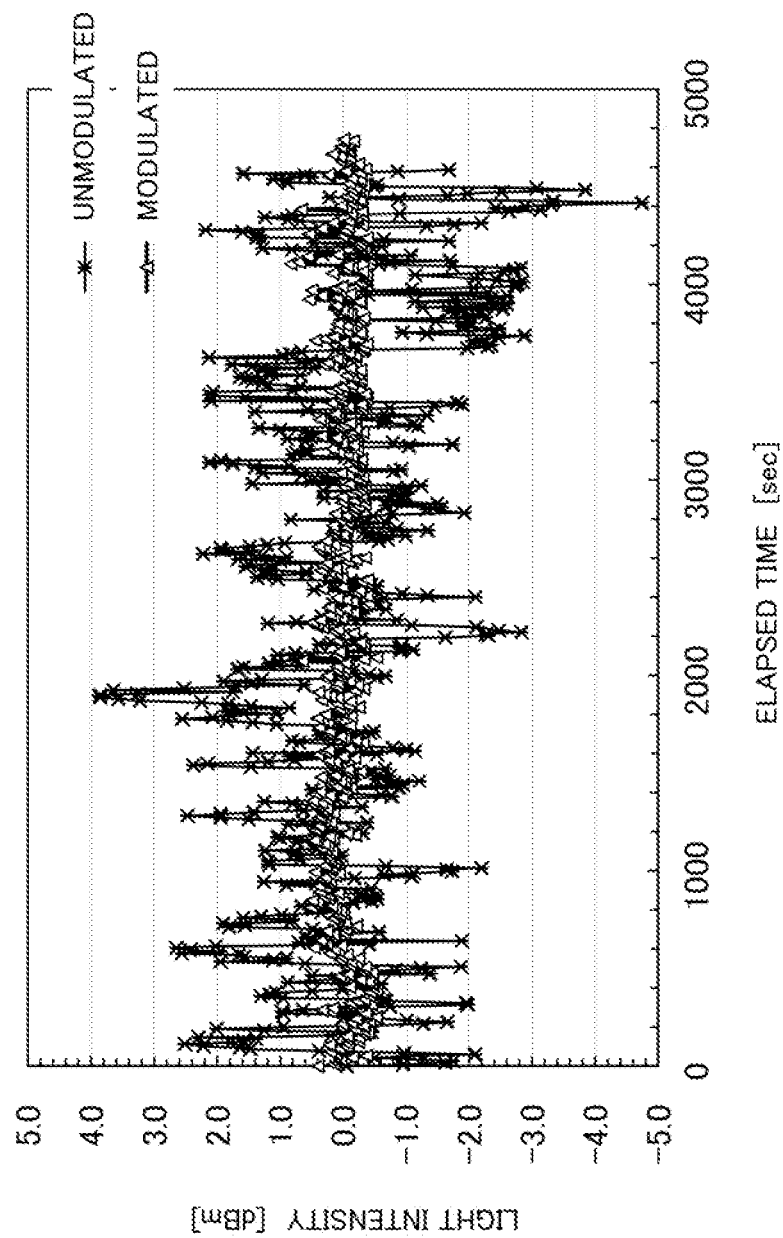
FIG. 5 is a diagram illustrating an example of a measured value of light intensity detected by a light monitor included in the light amplification device according to the second example embodiment of the present invention.

The signal light source 210 may be configured to include a light modulation means for modulating the optical carrier wave. The wavelength band of the optical carrier wave can be expanded by the light modulation means modulating the optical carrier wave. In FIG. 4, an example of a spectrum of output light from the signal light source 210 is illustrated. It can be seen that a wavelength band of modulated wave to which modulation has been applied is expanded compared to a spectrum of a continuous wave (CW) to which no modulation is applied. In FIG. 4, a spectrum when the modulation is performed at a baud rate of 66 gigabaud (Gbaud) is illustrated as an example. Since the larger the wavelength band is, the more wavelength components the wavelength band contains, it is possible to suppress interference between the optical signals passing through different cores. An example of a measured value of light intensity that is detected by the light monitor 244 in this occasion is illustrated in FIG. 5. It can be seen that a fluctuation value of the light intensity is significantly reduced by applying the modulation (with 66 Gbaud), compared to a case in which no modulation is applied (CW).

Next, a light amplification method according to the present example embodiment will be described.

In the light amplification method according to the present example embodiment, first, a wavelength band of an optical carrier wave is controlled, band control light is generated, and the band control light is introduced into a plurality of light amplification media. After that, the band control light is amplified in a coupled state in which propagation light propagating through the plurality of light amplification media induces a crosstalk. Further, the wavelength band is controlled in such a way that coherence of the band control light that has propagated through the plurality of light amplification media is reduced.

At a time of the above-described introduction of the band control light into the plurality of light amplification media, the band control light is introduced into a coupled multi-core optical fiber. Herein, a plurality of cores are arranged in close proximity in the coupled multi-core optical fiber, and a light amplification medium is included in at least a part of each of the plurality of cores.

Further, intensity of the band control light that has propagated through at least of one of the plurality of cores is detected, and light intensity information is generated. Herein, at a time of the above-described control of the wavelength band, the wavelength band is controlled based on the light intensity information.

As described above, according to the light amplification device 200 and the light amplification method according to the present example embodiment, it is possible to suppress time fluctuation of intensity of the optical signal being output from each core of the coupled multi-core optical fiber. Consequently, performance evaluation of a light amplification device using a coupled multi-core optical fiber and construction of a light transmission system using a coupled multi-core optical fiber are enabled.

Third Example Embodiment

Figure 6:
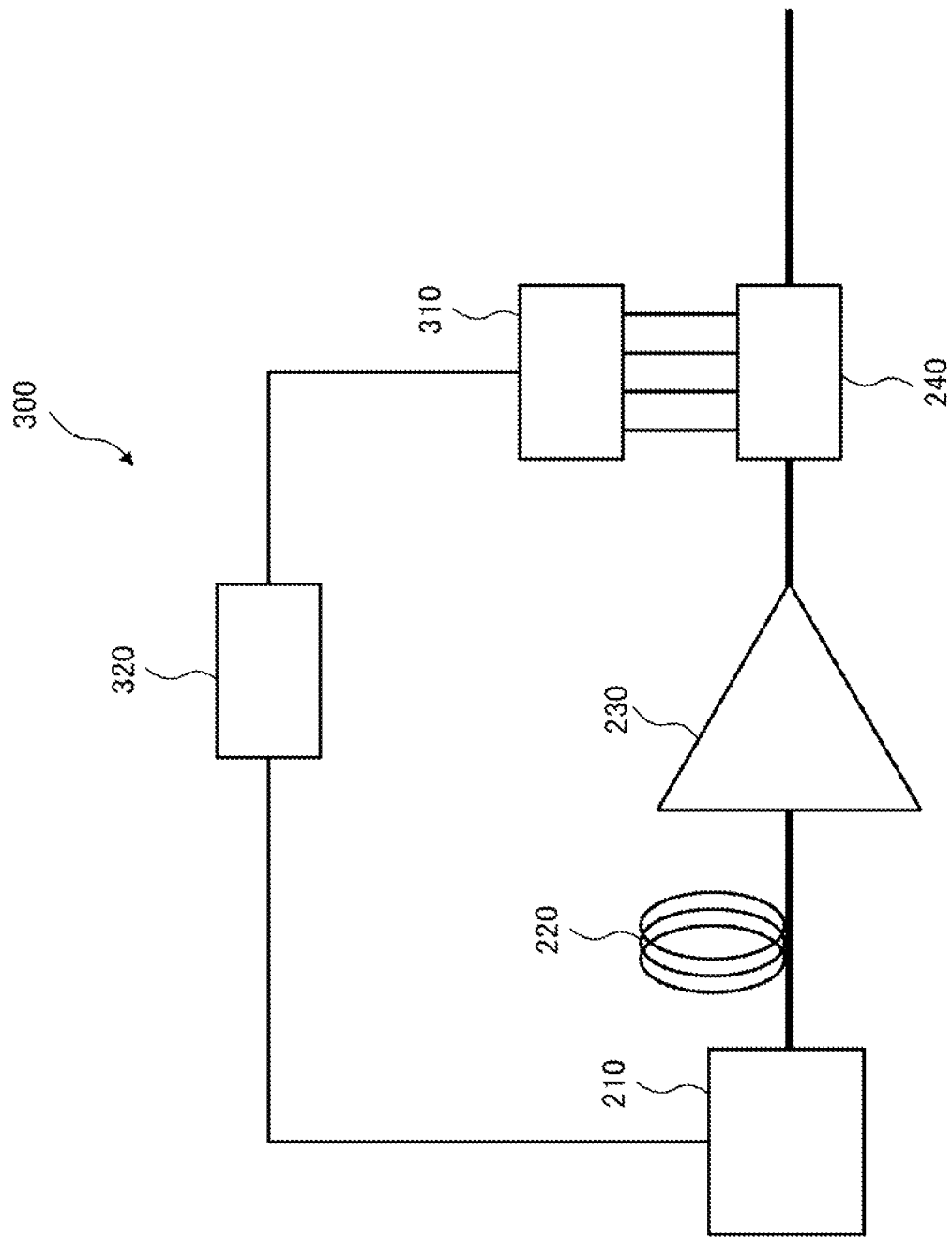
FIG. 6 is a block diagram illustrating a configuration of a light transmission system according to a third example embodiment of the present invention.

Next, a third example embodiment according to the present invention will be described. In FIG. 6, a configuration of a light transmission system 300 according to the present example embodiment is illustrated. Note that, the same component as in the light amplification device 200 according to the second example embodiment is denoted with the same reference sign, and detailed explanation thereof may be omitted.

The light transmission system 300 according to the present example embodiment includes a signal light source 210, a coupled multi-core optical fiber 220, a coupled multi-core fiber optical amplifier 230, and a light detection unit 240. The configuration up to this point is similar to the light amplification device 200 according to the second example embodiment. The light transmission system 300 according to the present example embodiment is configured to further include a light intensity fluctuation detector 310 and a control unit (control means) 320. Herein, the signal light source 210, the coupled multi-core optical fiber 220, and the coupled multi-core fiber optical amplifier 230 constitutes a light amplification means, and the light detection unit 240 and the light intensity fluctuation detector 310 constitutes a light detection means.

The signal light source 210 includes a band control means for controlling a wavelength band of an optical carrier wave and thereby generating band control light.

The coupled multi-core optical fiber 220 and the coupled multi-core fiber optical amplifier 230 include a coupled multi-core optical fiber in which a plurality of cores are arranged in close proximity. The coupled multi-core fiber optical amplifier 230 includes a plurality of light amplification media through which the band control light propagates, and amplifies the band control light in a coupled state in which propagation light propagating through the plurality of light amplification media induces a crosstalk. Note that, the coupled multi-core optical fiber 220 and the coupled multi-core fiber optical amplifier 230 constitute a band control light amplification means.

The light detection unit 240 detects intensity of the band control light that has propagated through at least one of a plurality of cores of the coupled multi-core fiber optical amplifier 230, and thereby generates light intensity information.

The control unit (control means) 320 controls the band control means in such a way as to adjust the wavelength band, based on the light intensity information. In this occasion, the band control means controls the wavelength band in such a way that coherence of the band control light that has propagated through the plurality of light amplification media (cores) of the coupled multi-core fiber optical amplifier 230 is reduced.

Next, an operation of the light transmission system 300 according to the present example embodiment will be described.

When time variation of intensity of the band control light that has been amplified by the coupled multi-core fiber optical amplifier 230 exceeds a predetermined threshold value, the light intensity fluctuation detector 310 generates warning information as the light intensity information. In this case, the control unit 320 controls the band control means included in the signal light source 210, in such a way as to increase the wavelength band, based on the warning information.

To explain in more detail, a light intensity fluctuation value for each of cores (in the case illustrated in FIG. 6, four cores), which has been output from the light detection unit 240, is input to the light intensity fluctuation detector 310. For example, a peak-to-peak value or the like can be used as the light intensity fluctuation value. The light intensity fluctuation detector 310 issues an alarm (warning information) to the control unit 320 when a statistical value of the light intensity fluctuation values of the cores, such as a maximum value and an average value, exceeds a predetermined constant threshold value. While the alarm is being issued, the control unit 320 transmits, to the band control means included in the signal light source 210, a control signal that instructs to gradually increase a wavelength band of signal light. By gradually expanding the wavelength band of the optical signal to be input to each core of the coupled multi-core fiber optical amplifier 230, it is possible to reduce the light intensity fluctuation value of the output from the coupled multi-core fiber optical amplifier 230. When determining that the light intensity fluctuation value decreases to the threshold value or less, the light intensity fluctuation detector 310 stops issuing the alarm.

Figure 7:
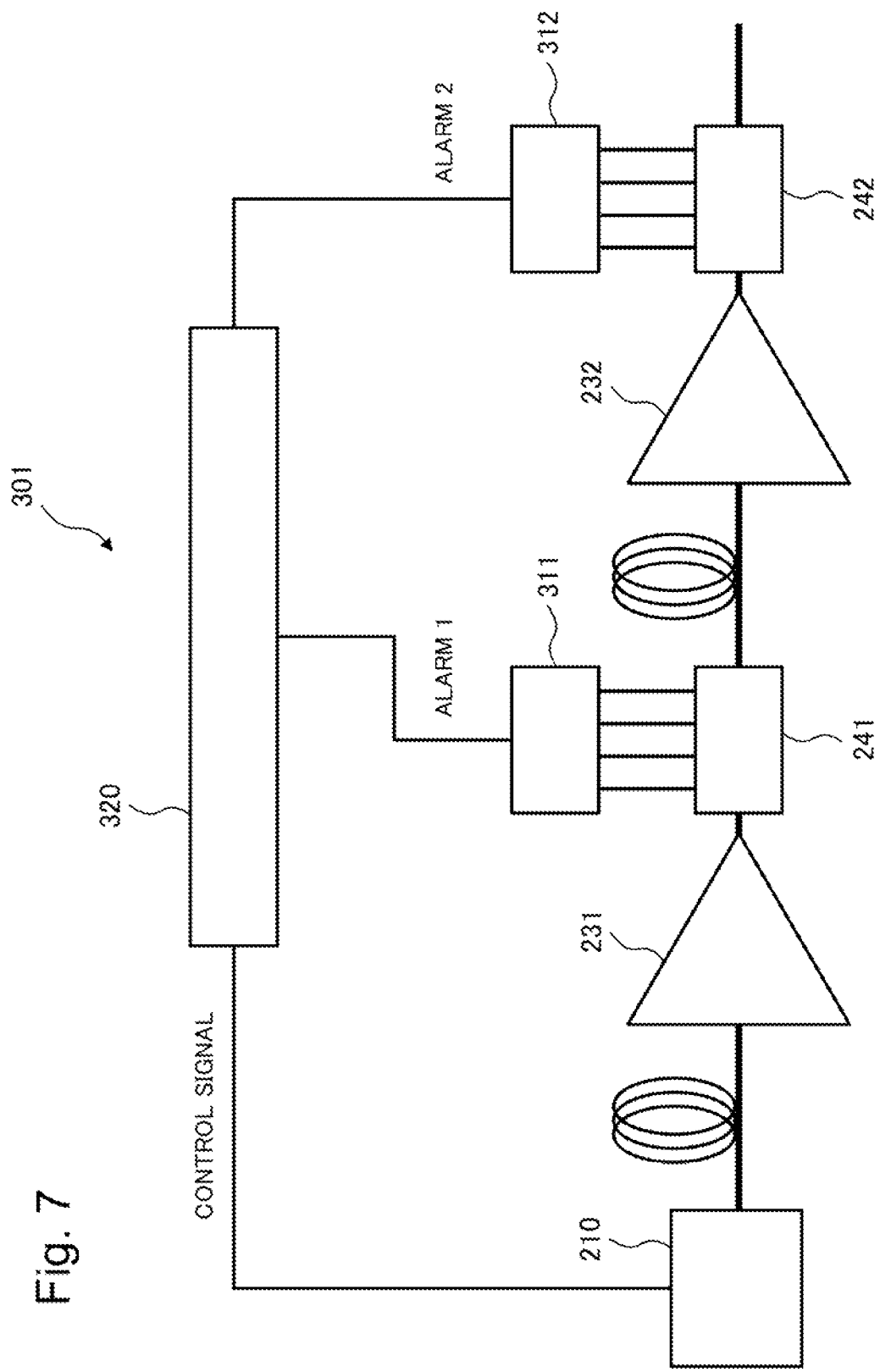
FIG. 7 is a block diagram illustrating another configuration of the light transmission system according to the third example embodiment of the present invention.

Note that, the light transmission system according to the present example embodiment may be configured to include a plurality of coupled multi-core fiber optical amplifiers 231 and 232, a plurality of light detection units 241 and 242, and a plurality of light intensity fluctuation detectors 311 and 312, such as a light transmission system 301 illustrated in FIG. 7. In the light transmission system 301 configured in such a way, a plurality of pieces of warning information (alarm 1, and alarm 2) are issued. In this case, the control unit 320 may be configured to continue transmitting the control signal until all of the alarms are stopped.

As described above, according to the light transmission systems 300 and 301 according to the present example embodiment, it is possible to suppress time fluctuation of intensity of the optical signal to be output from each core of the coupled multi-core optical fiber. Consequently, construction of a light transmission system using a coupled multi-core optical fiber is enabled.

Fourth Example Embodiment

Figure 8:
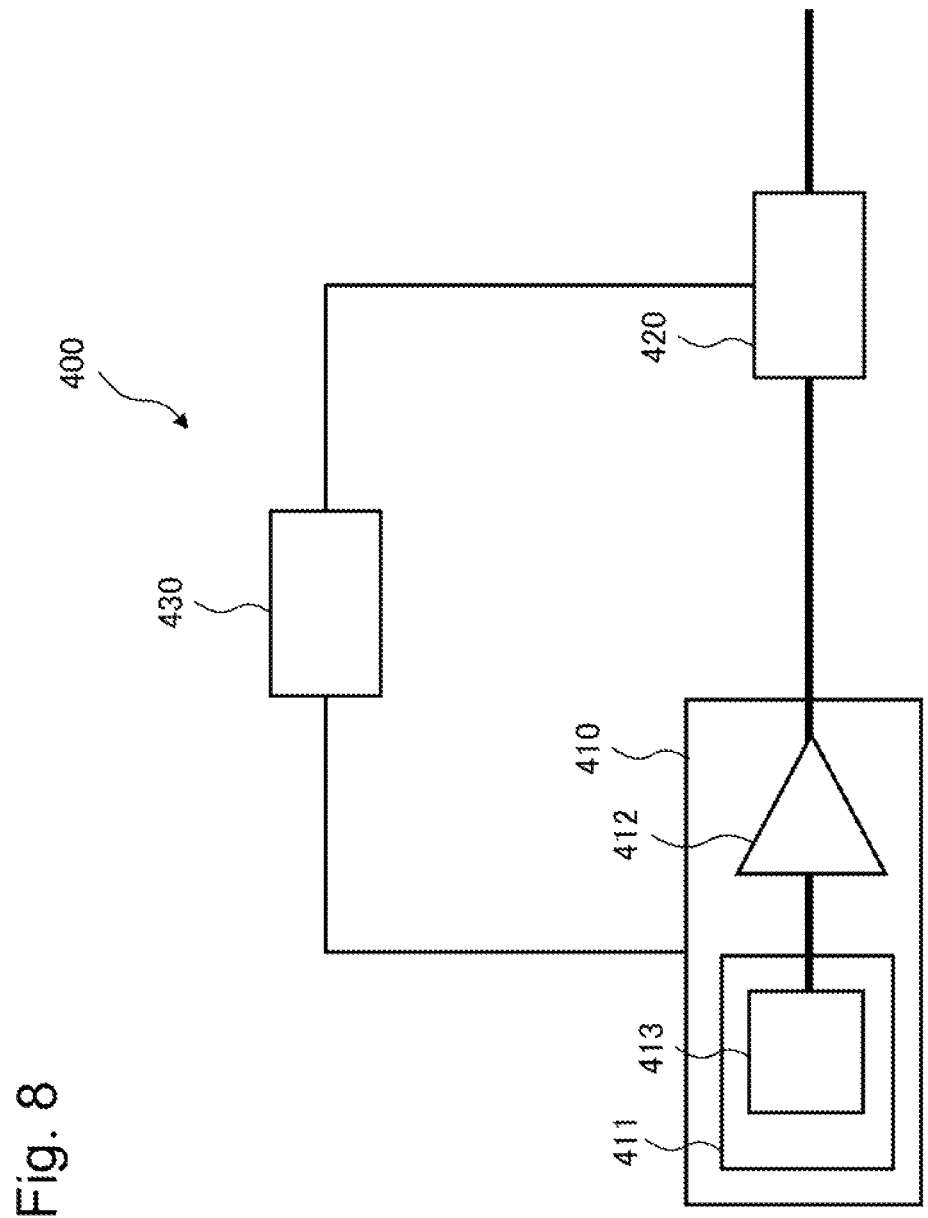
FIG. 8 is a block diagram illustrating a configuration of a light transmission system according to a fourth example embodiment of the present invention.

Next, a fourth example embodiment of the present invention will be described. A configuration of a light transmission system 400 according to the present example embodiment is illustrated in FIG. 8.

The light transmission system 400 according to the present example embodiment includes a light amplification unit (light amplification means) 410, a light detection unit (light detection means) 420, and a control unit (control means) 430.

The light amplification unit 410 controls a wavelength band of an optical carrier wave, generates band control light, and amplifies the band control light. The light detection unit 420 detects intensity of the band control light that has been amplified by the light amplification unit 410, and thereby generates light intensity information. Further, the control unit 430 controls the light amplification unit 410 in such a way as to adjust the wavelength band, based on the light intensity information.

Herein, the light amplification unit 410 may be configured to include a band control unit (band control means) 411 and a band control light amplification unit (band control light amplification means) 412.

The band control unit 411 controls a wavelength band of an optical carrier wave and thereby generates band control light. The band control light amplification unit 412 includes a plurality of light amplification media through which the band control light propagates. In this case, the band control light amplification unit 412 amplifies the band control light in a coupled state in which propagation light propagating through the plurality of light amplification media induces a crosstalk. Further, the band control unit 411 controls the wavelength band in such a way that coherence of the band control light that has propagated through the plurality of light amplification media is reduced.

Note that, the band control light amplification unit 412 may be configured to include a coupled multi-core optical fiber in which a plurality of cores are arranged in close proximity. Herein, the coupled multi-core optical fiber includes a light amplification medium in at least a part of each of the plurality of cores.

In the light transmission system 400 according to the present example embodiment, the band control unit 411 is configured to include a light modulator (light modulation means) 413 that modulates the optical carrier wave.

Next, an operation of the light transmission system 400 according to the present example embodiment will be described.

When time variation of intensity of the band control light that has been amplified by the light amplification unit 410 exceeds a predetermined threshold value, the light detection unit 420 generates warning information as the light intensity information. Further, the control unit 430 controls the light amplification unit 410 in such a way that a speed of modulating the optical carrier wave is increased and the number of cores through which the band control light propagates among the plurality of cores is decreased, based on the warning information.

In the following, the operation of the light transmission system 400 according to the present example embodiment will be described in more detail.

As described above, in the light transmission system 400 according to the present example embodiment, the number of cores to be used for the propagation of the band control light and the modulation speed (transmission speed), are changed, i.e., a multiplexing scheme is changed, based on a monitoring result of light intensity fluctuation by the light detection unit 420. An example of the multiplexing scheme is illustrated in FIG. 9.

First, the control unit 430 causes the light amplification unit 410 to transmit a transmission signal under conditions of a multiplexing scheme 1 illustrated in FIG. 9. Specifically, the transmission signal is transmitted by using N cores among the plurality of cores of the coupled multi-core optical fiber at a transmission speed B for each core. In this case, a transmission capacity per multi-core optical fiber is N×B.

When receiving the alarm (warning information) from the light detection unit 420, the control unit 430 instructs the light amplification unit 410 to switch a multiplexing scheme from the multiplexing scheme 1 to a multiplexing scheme 2. When the light amplification unit 410 changes the multiplexing scheme to the multiplexing scheme 2, the transmission speed is doubled (2×B), and the number of cores of the multi-core optical fiber to be used is a half (½×N). In this occasion, the transmission capacity per multi-core optical fiber is the same (N×B) in any case of the multiplexing schemes 1 and 2, and even when the multiplexing scheme is changed, the transmission capacity per multi-core optical fiber is unchanged.

When the transmission speed is increased by changing the multiplexing scheme to the multiplexing scheme 2, the wavelength band of the transmission signal can also be expanded, and therefore it is possible to suppress interference between the transmission signals propagating through each core. Specifically, it is possible to suppress light intensity fluctuation on a receiving end in a transmission system by changing a time-multiplicity (transmission speed) and a space-multiplicity (number of cores), based on a monitoring result of light intensity fluctuation. Consequently, an optical signal that cannot be received by using the multiplexing scheme 1 can be received by using the multiplexing scheme 2.

As described above, according to the light transmission system 400 according to the present example embodiment, it is possible to suppress time fluctuation of intensity of the optical signal to be output from each core of the coupled multi-core optical fiber. Consequently, construction of a light transmission system using a coupled multi-core optical fiber is enabled.

The whole or part of the example embodiments disclosed above can be described as, but not limited to, the following supplementary notes.

(Supplementary Note 1)

A light amplification device including: a band control means for controlling a wavelength band of an optical carrier wave and thereby generating band control light; and a band control light amplification means including a plurality of light amplification media through which the band control light propagates, wherein the band control light amplification means amplifies the band control light in a coupled state in which propagation light propagating through the plurality of light amplification media induces a crosstalk, and the band control means controls the wavelength band in such a way that coherence of the band control light that has propagated through the plurality of light amplification media is reduced.

(Supplementary Note 2)

The light amplification device according to supplementary note 1, wherein the band control light amplification means includes a coupled multi-core optical fiber in which a plurality of cores are arranged in close proximity, and the coupled multi-core optical fiber includes the light amplification medium in at least a part of each of the plurality of cores.

(Supplementary Note 3)

The light amplification device according to supplementary note 2, wherein the band control means controls the wavelength band in such a way that a coherence length of the band control light is shorter than a length of the coupled multi-core optical fiber.

(Supplementary Note 4)

The light amplification device according to supplementary note 2, wherein the band control means includes a light modulation means for modulating the optical carrier wave, and the light modulation means modulates the optical carrier wave with a frequency higher than an inverse number of a time required for the band control light to propagate through the coupled multi-core optical fiber.

(Supplementary Note 5)

The light amplification device according to supplementary note 2, further including a light detection means for detecting intensity of the band control light that has propagated through at least one of the plurality of cores and generating light intensity information, wherein the band control means controls the wavelength band, based on the light intensity information.

(Supplementary Note 6)

A light transmission system including: a light amplification means for controlling a wavelength band of an optical carrier wave and thereby generating band control light and amplifying the band control light, a light detection means for detecting intensity of the band control light that has been amplified by the light amplification means and generating light intensity information, and a control means for controlling the light amplification means in such a way as to adjust the wavelength band, based on the light intensity information.

(Supplementary Note 7)

The light transmission system according to supplementary note 6, wherein the light amplification means includes a band control means for controlling a wavelength band of the optical carrier wave and thereby generating band control light and, a band control light amplification means including a plurality of light amplification media through which the band control light propagates, the band control light amplification means amplifies the band control light in a coupled state in which propagation light propagating through the plurality of light amplification media induces a crosstalk, and the band control means controls the wavelength band in such a way that coherence of the band control light that has propagated through the plurality of light amplification media is reduced.

(Supplementary Note 8)

The light transmission system according to supplementary note 7, wherein the band control light amplification means includes a coupled multi-core optical fiber in which a plurality of cores are arranged in close proximity, and the coupled multi-core optical fiber includes the optical amplification medium in at least a part of each of the plurality of cores.

(Supplementary Note 9)

The light transmission system according to supplementary note 8, wherein the light detection means detects intensity of the band control light that has propagated through at least one of the plurality of cores and generates the light intensity information, and the band control means controls the wavelength band, based on the light intensity information.

(Supplementary Note 10)

The light transmission system according to any one of supplementary notes 6 to 9, wherein the light detection means generates warning information as the light intensity information when time variation of intensity of the band control light that has been amplified by the light amplification means exceeds a predetermined threshold value, and the control means controls the light amplification means in such a way as to increase the wavelength band, based on the warning information.

(Supplementary Note 11)

The light transmission system according to any one of supplementary notes 7 to 9, wherein the band control light amplification means includes a plurality of band control light amplification means, the light detection means includes a plurality of light detection means, each of which detects intensity of the band control light that has been amplified by one of the plurality of band control light amplification means, and generates warning information as the light intensity information when time variation of the intensity exceeds a predetermined threshold value, and the control means controls the band control means in such a way as to increase the wavelength band, based on the warning information.

(Supplementary Note 12)

The light transmission system according to supplementary note 8 or 9, wherein the band control means includes a light modulation means for modulating the optical carrier wave, the light detection means generates warning information as the light intensity information when time variation of intensity of the band control light that has been amplified by the light amplification means exceeds a predetermined threshold value, and the control means increases a speed at which the optical carrier wave is modulated, based on the warning information, and controls the light amplification means in such a way as to decrease the number of cores through which the band control light propagates, among the plurality of cores.

(Supplementary Note 13)

A light amplification method including: controlling a wavelength band of an optical carrier wave and thereby generating band control light; introducing the band control light into a plurality of light amplification media; amplifying the band control light in a coupled state in which propagation light propagating through the plurality of light amplification media induces a crosstalk; and controlling the wavelength band in such a way that coherence of the band control light that has propagated through the plurality of light amplification media is reduced.

(Supplementary Note 14)

The light amplification method according to supplementary note 13, wherein the introducing the band control light into the plurality of light amplification media includes introducing the band control light into a coupled multi-core optical fiber, a plurality of cores are arranged in close proximity in the coupled multi-core optical fiber, and the light amplification medium is included in at least a part of each of the plurality of cores.

(Supplementary Note 15)

The light amplification method according to supplementary note 14, wherein the controlling the wavelength band includes controlling the wavelength band in such a way that a coherence length of the band control light is shorter than a length of the coupled multi-core optical fiber.

(Supplementary Note 16)

The light amplification method according to supplementary note 14, wherein the controlling the wavelength band includes modulating the optical carrier wave, and the modulating the optical carrier wave includes modulating the optical carrier wave with a frequency higher than an inverse number of a time required for the band control light to propagate through the coupled multi-core optical fiber.

(Supplementary Note 17)

The light amplification method according to supplementary note 14, further including detecting intensity of the band control light that has propagated through at least one of the plurality of cores, and generating light intensity information, wherein the controlling the wavelength band includes controlling the wavelength band, based on the light intensity information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 100, 200 Light amplification device
110 Band control means
111 Light modulation means
120 Band control light amplification means
210 Signal light source
220 Coupled multi-core optical fiber
230, 231, 232 Coupled multi-core fiber optical amplifier
240, 241, 242, 420 Light detection unit
241 Fan-out connection means
242 Fan-in connection means
243 Single-mode fiber
244 Light monitor
300, 301, 400 Light transmission system
310, 311, 312 Light intensity fluctuation detector
320, 430 Control unit
410 Light amplification unit
411 Band control unit
412 Band control light amplification unit
413 Light Modulator

What is claimed is:

1. A light amplification device comprising:
a band control unit configured to control a wavelength band of an optical carrier wave and thereby generate band control light; and
a band control light amplification unit including a plurality of light amplification media through which the band control light propagates, wherein:
the band control light amplification unit amplifies the band control light in a coupled state in which propagation light propagating through the plurality of light amplification media induces a crosstalk, and
the band control unit controls the wavelength band in such a way that coherence of the band control light that has propagated through the plurality of light amplification media is reduced.

2. The light amplification device according to claim 1, wherein:
the band control light amplification unit includes a coupled multi-core optical fiber in which a plurality of cores are arranged in close proximity, and
the coupled multi-core optical fiber includes the light amplification medium in at least a part of each of the plurality of cores.

3. The light amplification device according to claim 2, wherein the band control unit controls the wavelength band in such a way that a coherence length of the band control light is shorter than a length of the coupled multi-core optical fiber.

4. The light amplification device according to claim 2, wherein:
the band control unit includes a light modulation unit configured to modulate the optical carrier wave, and
the light modulation unit modulates the optical carrier wave with a frequency higher than an inverse number of a time required for the band control light to propagate through the coupled multi-core optical fiber.

5. The light amplification device according to claim 2, further comprising a light detection unit configured to detect intensity of the band control light that has propagated through at least one of the plurality of cores, and generate light intensity information, wherein the band control unit controls the wavelength band, based on the light intensity information.

6. A light transmission system comprising:
a light amplification unit configured to control a wavelength band of an optical carrier wave and thereby generate band control light and amplify the band control light;
a light detection unit configured to detect intensity of the band control light that has been amplified by the light amplification unit, and generate light intensity information; and
a control unit configured to control the light amplification unit in such a way as to adjust the wavelength band, based on the light intensity information.

7. The light transmission system according to claim 6, wherein:
the light amplification unit includes:
a band control unit configured to control a wavelength band of the optical carrier wave and thereby generate band control light; and
a band control light amplification unit including a plurality of light amplification media through which the band control light propagates,
the band control light amplification unit amplifies the band control light in a coupled state in which propagation light propagating through the plurality of light amplification media induces a crosstalk, and
the band control unit controls the wavelength band in such a way that coherence of the band control light that has propagated through the plurality of light amplification media is reduced.

8. The light transmission system according to claim 7, wherein:
the band control light amplification unit includes a coupled multi-core optical fiber in which a plurality of cores are arranged in close proximity, and
the coupled multi-core optical fiber includes the light amplification medium in at least a part of each of the plurality of cores.

9. The light transmission system according to claim 8, wherein:
the light detection unit detects intensity of the band control light that has propagated through at least one of the plurality of cores, and generates the light intensity information, and
the band control unit controls the wavelength band, based on the light intensity information.

10. The light transmission system according to claim 6, wherein:
the light detection unit generates warning information as the light intensity information when time variation of intensity of the band control light that has been amplified by the light amplification unit exceeds a predetermined threshold value, and
the control unit controls the light amplification unit in such a way as to increase the wavelength band, based on the warning information.

11. The light transmission system according to claim 7, wherein:
the band control light amplification unit includes a plurality of band control light amplification units,
the light detection unit includes a plurality of light detection units, each of which detects intensity of the band control light that has been amplified by one of the plurality of band control light amplification units, and generates warning information as the light intensity information when time variation of the intensity exceeds a predetermined threshold value, and
the control unit controls the band control unit in such a way as to increase the wavelength band, based on the warning information.

12. The light transmission system according to claim 8, wherein:
the band control unit includes a light modulation unit configured to modulate the optical carrier wave,
the light detection unit generates warning information as the light intensity information when time variation of intensity of the band control light that has been amplified by the light amplification unit exceeds a predetermined threshold value, and
the control unit increases a speed at which the optical carrier wave is modulated, based on the warning information, and controls the light amplification unit in such a way as to decrease a number of cores through which the band control light propagates, among the plurality of cores.

13. A light amplification method comprising:
controlling a wavelength band of an optical carrier wave and thereby generating band control light;

introducing the band control light into a plurality of light amplification media;

amplifying the band control light in a coupled state in which propagation light propagating through the plurality of light amplification media induces a crosstalk; and controlling the wavelength band in such way that coherence of the band control light that has propagated through the plurality of light amplification media is reduced.

14. The light amplification method according to claim 13, wherein:

the introducing the band control light into the plurality of light amplification media includes introducing the band control light into a coupled multi-core optical fiber, and a plurality of cores are arranged in close proximity in the coupled multi-core optical fiber, and the light amplification medium is included in at least a part of each of the plurality of cores.

15. The light amplification method according to claim 14, wherein the controlling the wavelength band includes controlling the wavelength band in such a way that a coherence length of the band control light is shorter than a length of the coupled multi-core optical fiber.

16. The light amplification method according to claim 14, wherein:

the controlling the wavelength band includes modulating the optical carrier wave, and the modulating the optical carrier wave includes modulating the optical carrier wave with a frequency higher than an inverse number of a time required for the band control light to propagate through the coupled multi-core optical fiber.

17. The light amplification method according to claim 14, further comprising:

detecting intensity of the band control light that has propagated through at least one of the plurality of cores, and generating light intensity information, wherein the controlling the wavelength band includes controlling the wavelength band, based on the light intensity information.

18. The light transmission system according to claim 7, wherein:

the light detection unit generates warning information as the light intensity information when time variation of intensity of the band control light that has been amplified by the light amplification unit exceeds a predetermined threshold value, and the control unit controls the light amplification unit in such a way as to increase the wavelength band, based on the warning information.

19. The light transmission system according to claim 8, wherein:

the band control light amplification unit includes a plurality of band control light amplification units, the light detection unit includes a plurality of light detection units, each of which detects intensity of the band control light that has been amplified by one of the plurality of band control light amplification units, and generates warning information as the light intensity information when time variation of the intensity exceeds a predetermined threshold value, and the control unit controls the band control unit in such a way as to increase the wavelength band, based on the warning information.

20. The light transmission system according to claim 9, wherein:

the band control unit includes a light modulation unit configured to modulate the optical carrier wave, the light detection unit generates warning information as the light intensity information when time variation of intensity of the band control light that has been amplified by the light amplification unit exceeds a predetermined threshold value, and the control unit increases a speed at which the optical carrier wave is modulated, based on the warning information, and controls the light amplification unit in such a way as to decrease a number of cores through which the band control light propagates, among the plurality of cores.

* * * * *